(12) United States Patent
Bar-Yona

(10) Patent No.: US 7,234,257 B2
(45) Date of Patent: Jun. 26, 2007

(54) MEANS FOR MAINTAINING SPATIAL RELATIONSHIPS IN LENTICULAR DISPLAY UNITS

(75) Inventor: Itzchak Bar-Yona, Rosh Ha'Ayin (IL)

(73) Assignee: Nutshell Ltd., Ramat-Gan (IL)

( * ) Notice: Subject to any disclaimer, the term of this patent is extended or adjusted under 35 U.S.C. 154(b) by 0 days.

(21) Appl. No.: 10/363,694

(22) PCT Filed: Sep. 10, 2001

(86) PCT No.: PCT/IL01/00857

§ 371 (c)(1),
(2), (4) Date: Sep. 22, 2003

(87) PCT Pub. No.: WO02/23510

PCT Pub. Date: Mar. 21, 2002

(65) Prior Publication Data

US 2004/0074121 A1    Apr. 22, 2004

(30) Foreign Application Priority Data

Sep. 14, 2000   (IL) ..................................... 138461

(51) Int. Cl.
*G03B 25/02* (2006.01)
(52) U.S. Cl. .......................................... 40/454; 40/466
(58) Field of Classification Search ............. 40/454, 40/453, 466, 470, 509, 508, 436, 437, 792
See application file for complete search history.

(56) References Cited

U.S. PATENT DOCUMENTS

| 1,475,430 A | 11/1923 | Curwen |
| 1,989,553 A | 1/1935 | Kanolt |
| 3,119,195 A | 1/1964 | Braunhut |
| 3,314,179 A | 4/1967 | Leach |
| 3,421,805 A * | 1/1969 | Rowland ..................... 359/622 |

(Continued)

FOREIGN PATENT DOCUMENTS

CH           131 144        1/1929

(Continued)

OTHER PUBLICATIONS

Lenticular Printing Software; Updated Jan. 21, 2004; Lenticular Holograms 3D Printing Software; http://www.3dz.co.uk.

(Continued)

*Primary Examiner*—Gary C. Hoge
(74) *Attorney, Agent, or Firm*—Martin Fleit; Paul D. Bianco; Fleit Kain Gibbons Gutman Bongini & Bianco, P.L.

(57) ABSTRACT

The present invention provides an improved lenticular display unit for advertising, information, or decoration. The unit comprises means for maintaining the required spatial relationship between the indicia carrier, on which the information to be displayed is contained, and the lenticular panel containing the lenses used to display the information. In some embodiments, the unit employs spring means for maintaining the required spatial relationship, which is maintaining the required distance between the indicia carrier on which the information to be displayed is contained, and the lenticular panel containing the lenses used to display the information.

17 Claims, 11 Drawing Sheets

U.S. PATENT DOCUMENTS

| | | |
|---|---|---|
| 3,562,941 A | 2/1971 | Boden |
| 3,604,536 A | 9/1971 | Dinnerstein |
| 3,613,277 A | 10/1971 | Rose et al. |
| 3,660,919 A | 5/1972 | Nagel |
| 3,686,781 A | 8/1972 | Calhoun, Jr. |
| 3,742,631 A | 7/1973 | Hasala |
| 3,811,213 A | 5/1974 | Eaves |
| 4,034,555 A | 7/1977 | Rosenthal |
| 4,067,129 A | 1/1978 | Abramson et al. |
| 4,118,879 A * | 10/1978 | Simon .......... 40/437 |
| 4,454,670 A | 6/1984 | Bachmann et al. |
| 4,605,311 A | 8/1986 | Loitz |
| 4,870,768 A | 10/1989 | Watt et al. |
| 5,007,190 A | 4/1991 | Shyu |
| 5,035,929 A | 7/1991 | Myers et al. |
| 5,100,330 A | 3/1992 | Sekiguchi |
| 5,146,703 A | 9/1992 | Boden |
| 5,237,766 A * | 8/1993 | Mikolay .......... 40/564 |
| 5,270,636 A | 12/1993 | Lafferty |
| 5,276,987 A | 1/1994 | Honse |
| 5,344,250 A | 9/1994 | Kringel et al. |
| 5,416,997 A | 5/1995 | Dyment et al. |
| 5,426,879 A | 6/1995 | Hecker |
| 5,440,214 A | 8/1995 | Peeters |
| 5,488,451 A | 1/1996 | Goggins |
| 5,494,445 A | 2/1996 | Sekiguchi et al. |
| 5,513,458 A | 5/1996 | Dehli |
| 5,586,089 A | 12/1996 | McGarvey |
| 5,647,151 A | 7/1997 | Fantone et al. |
| 5,706,142 A | 1/1998 | Lee |
| 5,720,123 A | 2/1998 | Taylor |
| 5,724,758 A | 3/1998 | Gulick, Jr. |
| 5,757,545 A * | 5/1998 | Wu et al. .......... 359/463 |
| 5,760,572 A | 6/1998 | Takeda et al. |
| 5,767,650 A | 6/1998 | Dehli et al. |
| 5,783,919 A * | 7/1998 | Dehli et al. .......... 318/466 |
| 5,815,968 A * | 10/1998 | Dehli .......... 40/476 |
| 6,026,215 A | 2/2000 | Fantone et al. |
| 6,070,349 A * | 6/2000 | Fantone et al. .......... 40/454 |
| 6,070,350 A * | 6/2000 | Fantone et al. .......... 40/454 |
| 6,076,293 A | 6/2000 | Bergeron |
| 6,078,424 A | 6/2000 | Morton |
| 6,219,948 B1 * | 4/2001 | Bar-Yona .......... 40/454 |
| 6,226,906 B1 | 5/2001 | Bar-Yona |
| 6,553,699 B2 | 4/2003 | Edmunds et al. |
| 2001/0018808 A1 | 9/2001 | Bar-Yona |

FOREIGN PATENT DOCUMENTS

| | | |
|---|---|---|
| CH | 321 586 | 5/1957 |
| CH | 337 793 | 5/1959 |
| EP | 0 537 310 | 4/1993 |
| EP | 0 622 653 | 11/1994 |
| EP | 0 570 807 | 7/1999 |
| EP | 943 272 | 9/1999 |
| EP | 0 619 513 | 2/2000 |
| EP | 1 001 401 | 5/2000 |
| EP | 1 067 503 | 1/2001 |
| EP | 1 128 344 | 8/2001 |
| EP | 0 713 120 | 9/2003 |
| EP | 0 685 924 | 1/2004 |
| GB | 429 042 | 5/1935 |
| JP | 4626659 | 4/1971 |
| JP | 5114019 | 5/1976 |
| JP | 2-54816 | 2/1990 |
| JP | 2-211437 | 8/1990 |
| JP | 2240644 | 9/1990 |
| JP | 03 111887 | 5/1991 |
| JP | 5-17537 | 3/1993 |
| JP | 7334259 | 12/1995 |
| JP | 08 320659 | 12/1996 |
| JP | 10-134235 | 5/1998 |
| JP | 11-66410 | 3/1999 |
| NL | 1 013 841 | 6/2001 |
| WO | 90/14782 | 12/1990 |
| WO | 95/30176 | 1/1996 |
| WO | 97/30436 | 6/1998 |

OTHER PUBLICATIONS

3DZ v3.00 Software for PC; Updated Jan. 21, 2004; Lenticular Lenses—Plastic lens sheet; http://www.3dz.co.uk/products.html.

* cited by examiner

MEANS FOR MAINTAINING SPATIAL RELATIONSHIPS IN LENTICULAR DISPLAY UNITS

FIELD OF THE INVENTION

The present invention relates to the field of lenticular display units, which provide a multi-image presentation for advertising, information, or decoration purposes. Specifically the invention relates to means, and to display units incorporating these means, for maintaining the required spatial relationship between the indicia carrier, on which the information to be displayed is contained, and the lenticular panel containing the lenses used to display the information.

BACKGROUND OF THE INVENTION

Lenticular technology, in particular, as applied in known dynamic display units, requires accurate relationships between the lithographic print and the frontal lenticular panel, if adequate imaging is to be achieved.

One of the most important of these relationships is the maintenance of an exact distance between the printed information and the lenses of the lenticular panel. In U.S. Pat. No. 6,226,906 by the same applicant hereof, the description of which is incorporated herein by reference, the correct distance is maintained by placing the printed indicia carrier within a narrow gap between the front lenticular panel and a rear supporting one.

In small format units, a uniform width, narrow gap can be easily achieved. However, for large format lenticular panels, for example of size $A_2$, $A_1$, or $A_0$, a uniform gap cannot be achieved. This difficulty is inherent to large plastic panels produced by extrusion or injection, since the panel will always deform upon cooling down, after production, and therefore will be non-planar.

The difficulty of maintaining the exact distance becomes even more difficult to solve when relative motion takes place between the image carrier and the lenticular panel in a dynamic display unit. No prior art, large format display unit provides an adequate answer to this problem and an innovative solution is needed.

A second condition for satisfactory presentation of the images is that perfect alignment must be maintained between the lines of printed information and the axis of the lenses. In small format units, this relationship is relatively easy to accomplish, but in larger units even the smallest deviation in angular alignment will result in a large vertical displacement at one or both edges of the display.

The problem is exacerbated in display units where the sheet containing the printed material is replaced with another in order to change the display. In this case, even if perfect alignment of the printed lines and lenses existed with the original sheet, the alignment will not necessarily be preserved on changing sheets since, for example, the lines on the second sheet might be printed at a slight angle to the edge of the sheet.

It is therefore a purpose of this invention to provide means for maintaining the required distance between the indicia carrier, on which the information to be displayed is contained, and the lenticular panel, containing the lenses used to display the information, and also to provide both static and dynamic display units incorporating these means.

It is another purpose of this invention to provide means for acquiring and maintaining the required angular alignment between the printed lines on the indicia carrier, on which the information to be displayed is contained, and the axes of the lenses, contained on the lenticular panel, which are used to display the information, and also to provide both static and dynamic display units incorporating these means.

Further purposes and advantages of this invention will appear as the description proceeds.

SUMMARY OF THE INVENTION

The present invention provides an improved lenticular display unit for advertising, information, or decoration. The unit comprises means for maintaining the required spatial relationship between the indicia carrier, on which the information to be displayed is contained, and the lenticular panel containing the lenses used to display the information. In some embodiments, the unit employs spring means for maintaining the required spatial relationship, which is maintaining the required distance between the indicia carrier on which the information to be displayed is contained, and the lenticular panel containing the lenses used to display the information.

In a first aspect, the required spatial relationship is the required distance between the indicia carrier on which the information to be displayed is contained, and the lenticular panel containing the lenses used to display the information.

In preferred embodiments of the invention, the means for maintaining the required distance between the indicia carrier on which the information to be displayed is contained, and the lenticular panel containing the lenses used to display the information is an elastically resilient mat-like element. The mat-like element can be composed of, for example, flexible fibers, cloth, felt, fleece, corrugated flexible film, bubble plastic, or an array of leaf springs. In some applications the elastically resilient mat-like element is transparent.

In a second aspect, the required spatial relationship is the required angular alignment between the printed lines on the indicia carrier on which the information to be displayed is contained, and the axes of the lenses provided in the lenticular panel.

In some preferred embodiments of the invention, the means for acquiring and maintaining the required angular alignment between the printed lines on the indicia carrier on which the information to be displayed is contained, and the axes of the lenses provided in the lenticular panel, consist of a screw containing an eccentrically mounted pin that penetrates said indicia carrier. When the screw is turned, the indicia carrier is caused to tilt. In other preferred embodiments, the means for acquiring and maintaining the required angular alignment between the printed lines on the indicia carrier on which the information to be displayed is contained, and the axes of the lenses provided in the lenticular panel, consist of a screw connected to an eccentrically mounted pin that penetrates an element of the display system. The indicia carrier is attached to the element and, when the screw is turned, the element and the indicia carrier attached to it are caused to tilt.

In all aspects of the invention, the lenticular display system can be either static or dynamic and either single-faced or double-faced. In addition, the unit may contain a back-lighting arrangement for illuminating a graphic presentation provided on the indicia carrier.

In another aspect, the invention provides a device comprising an elastically resilient mat-like element for maintaining the required distance between an indicia carrier, on which information to be displayed is contained, and a lenticular panel containing the lenses used to display the information in a lenticular display system. The mat-like element can be composed of, for example, flexible fibers, cloth, felt, fleece, corrugated flexible film, bubble plastic, or an array of leaf springs. In some applications the elastically resilient mat-like element is transparent.

In a further aspect, the invention provides a device for acquiring and maintaining the required angular alignment between the printed lines on the indicia carrier on which the information to be displayed is contained, and the axes of the lenses provided in the lenticular panel of a lenticular display system, comprising tilt correction means. The tilt correction means consist of a screw containing an eccentrically mounted pin that penetrates either the indicia carrier directly or an element of the display system to which the indicia carrier is attached.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

The invention will now be further explained through the following illustrative and non-limitative description of preferred embodiments.

Definitions;

In this application:

1) the terms "sign" and "display unit" are used interchangeably to refer to display units based on lenticular technology;

2) the terms "large size" and "large format" are used interchangeably and refer to size, of about, A2 (320 mm×400 mm) or larger; and 3) the terms "sheet", "film", and "indicia carrier" are used interchangeably to refer to any flexible surface onto which information can be printed, including, but not limited to, paper sheets, polymeric films, and layered composite materials.

Figure 1A:
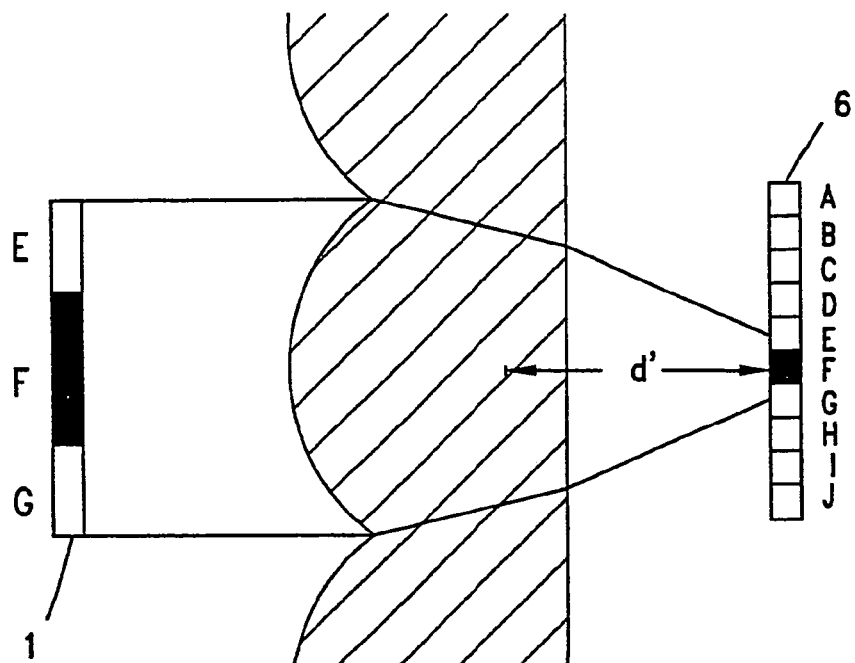
FIGS. 1A and 1B illustrate a type of optical distortion, typical of the use of lenticular panels.
Figure 1B:
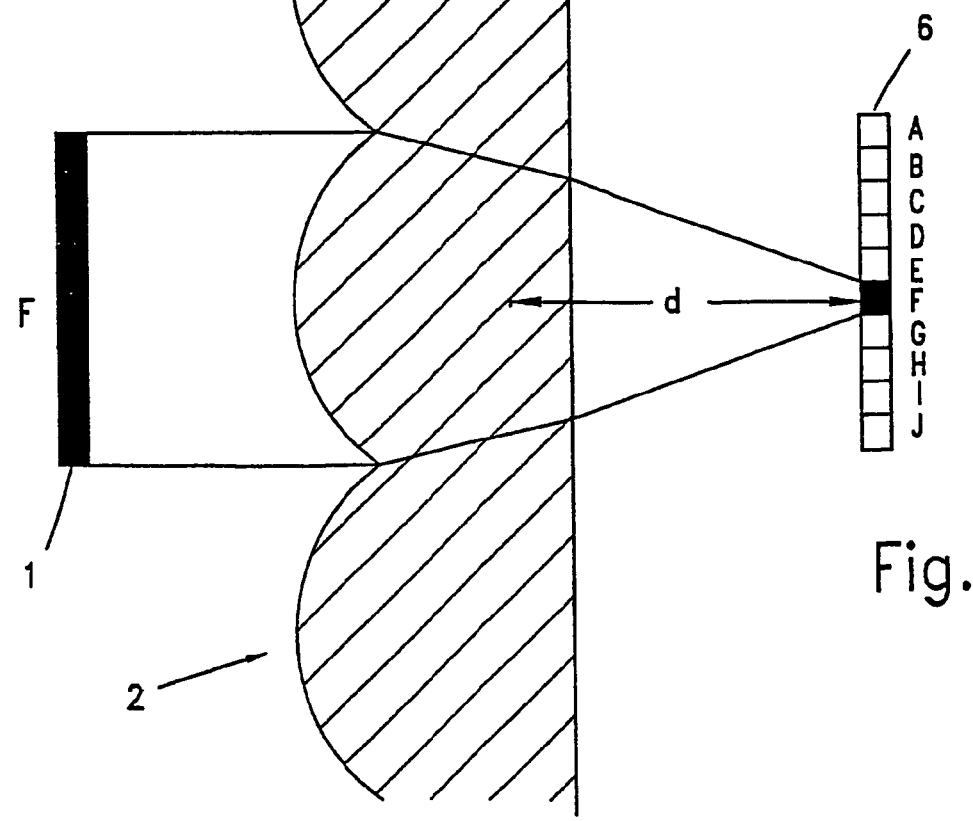

FIG. 1A and FIG. 1B are schematic presentations of a typical optical distortion encountered with lenticular panels. There is shown, in cross-section, a lenticular panel 2 having an array of convex, cylindrical lenses 4, having focal length f, and an indicia carrier 6 with printed lines marked A, B, C, D, E, F, G, H, I, J, positioned at two different typical distances d from the lenses. Numeral 1 designates the image seen by the observer. In both figures, the center of the printed lines are exactly lined up with the center of the lenses. When print 6 is located at its correct distance, as shown in FIG. 1B, i.e. d=f, printed line F will be projected as magnified F. In FIG. 1A, the focal error tolerance is not respected, i.e. d<f. The result is a projected image F together with portions of images E and G and the entire presentation will appear chaotic to the observer's eye.

Figure 2:
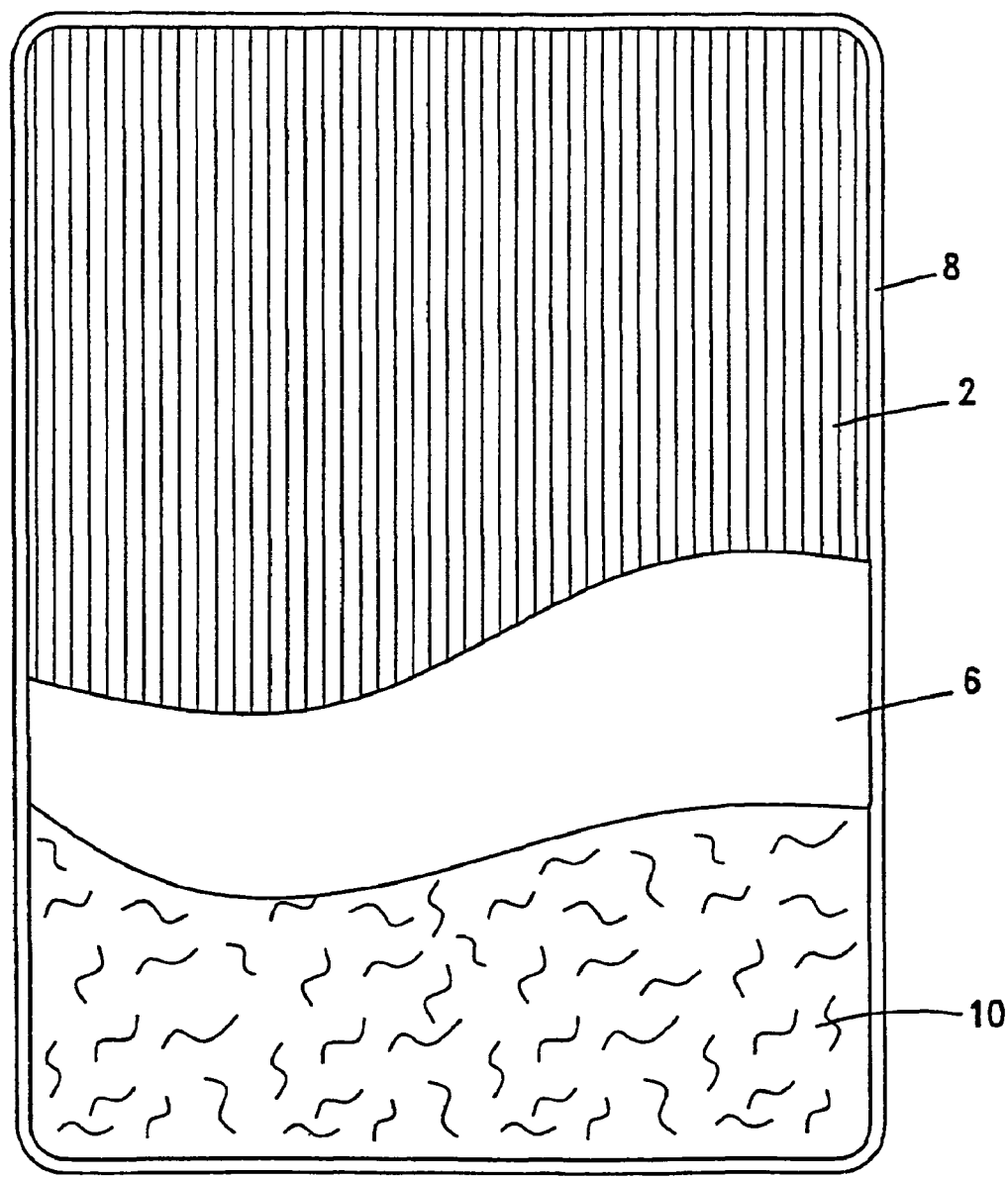
FIG. 2 represents a static display unit containing an elastically resilient support means of the present invention.
Figure 3:
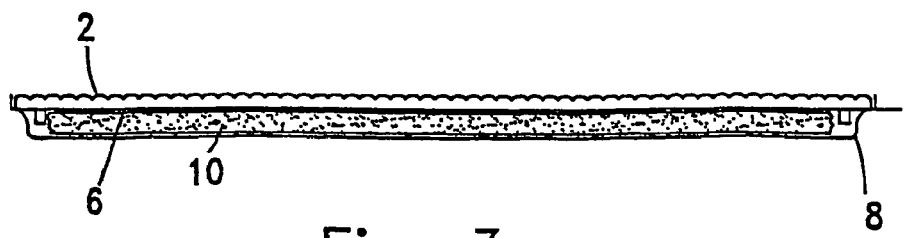
FIG. 3 is a horizontal cross-section of the unit of FIG. 2.

FIG. 2 illustrates a front view of a large-sized sign in accordance with a preferred embodiment of the invention. FIG. 3 is a cross-sectional view of the same unit. FIGS. 2 and 3 show a rectangular, tray-like housing 8 supporting a flat, lenticular panel 2 composed of vertically oriented, identical linear lenses 4, the focal lengths of which are equal to the thickness of the panel. Partially removed, panel 2 exposes the image-carrying sheet 6, which is pressed against its rear face.

At a third level, behind film 6, there is seen an elastically resilient mat-like element 10. This mat-like element is made of flexible fibers or other suitable material, e.g a 10 mm to 25 mm thick mat of non-woven hollow acrylic fibers. Such material is known as fleece.

Figure 3A:
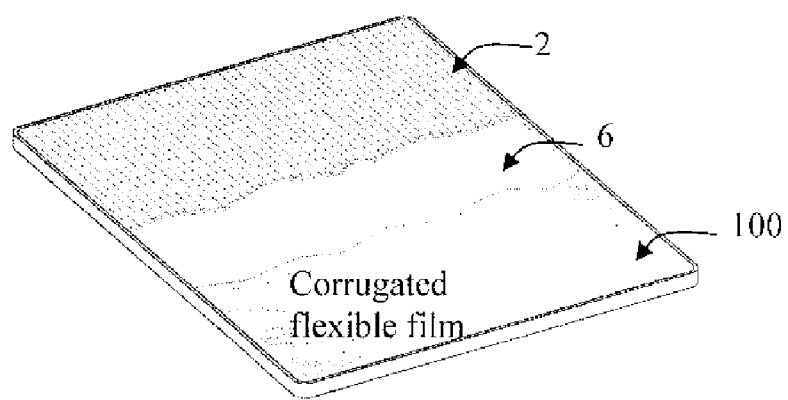
FIG. 3A is a schematic illustration of a display unit, in accordance with an exemplary embodiment of the invention.
Figure 3B:
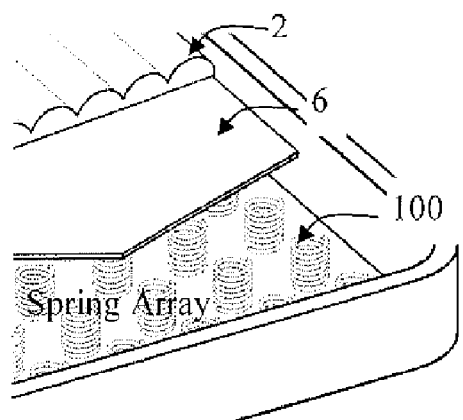
FIG. 3B illustrates a spring array in accordance with the invention.
Figure 3C:
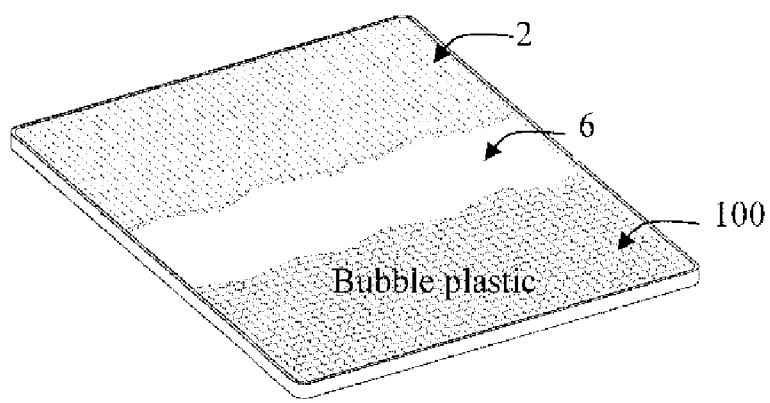
FIG. 3C illustrates bubble plastic in accordance with the invention.

While the elastically resilient means in the form of mat-like element 10 is described above as made of flexible fibers, alternative means may be used, as used with relation to FIG. 3A. Such alternate materials could be, any pressure applicator 100, for example: cloth, felt, fleece, a corrugated, flexible film; a bubble plastic, such as the kind used for packaging; or an array of leaf springs raised from tray-like housing 8.

This elastically resilient mat-like element presses the image-carrying sheet against the back surface of the lenticular panel and thus assures that essentially all of the area of the sheet is in contact with the substantially planar rear surface of the lenticular panel. Since the thickness of the lenticular panel is equal to the focal length of the lenses, the locus of the linear foci of all linear lenses 4, regardless of any deformations typical of plastic panels of large size is on this rear surface therefore maintaining the exact distance between the printed information and the lenses of the lenticular panel under all conditions.

Thus mat-like element 10 serves the purpose of maintaining the required distance between the indicia carrier on which the information to be displayed is contained, and the lenticular panel containing the lenses used to display the information. Mat-like element 10 may suffer bending or thermal deformation and yet will still satisfy the rigorous demand formulated above: maintaining accurate focal distance for each printed spot of the indicia carrier. As will be shown hereinafter, mat-like element 10 can be incorporated into, and will maintain the required distance between, the indicia sheet and the lenses, in both static and dynamic display units.

Figure 4:
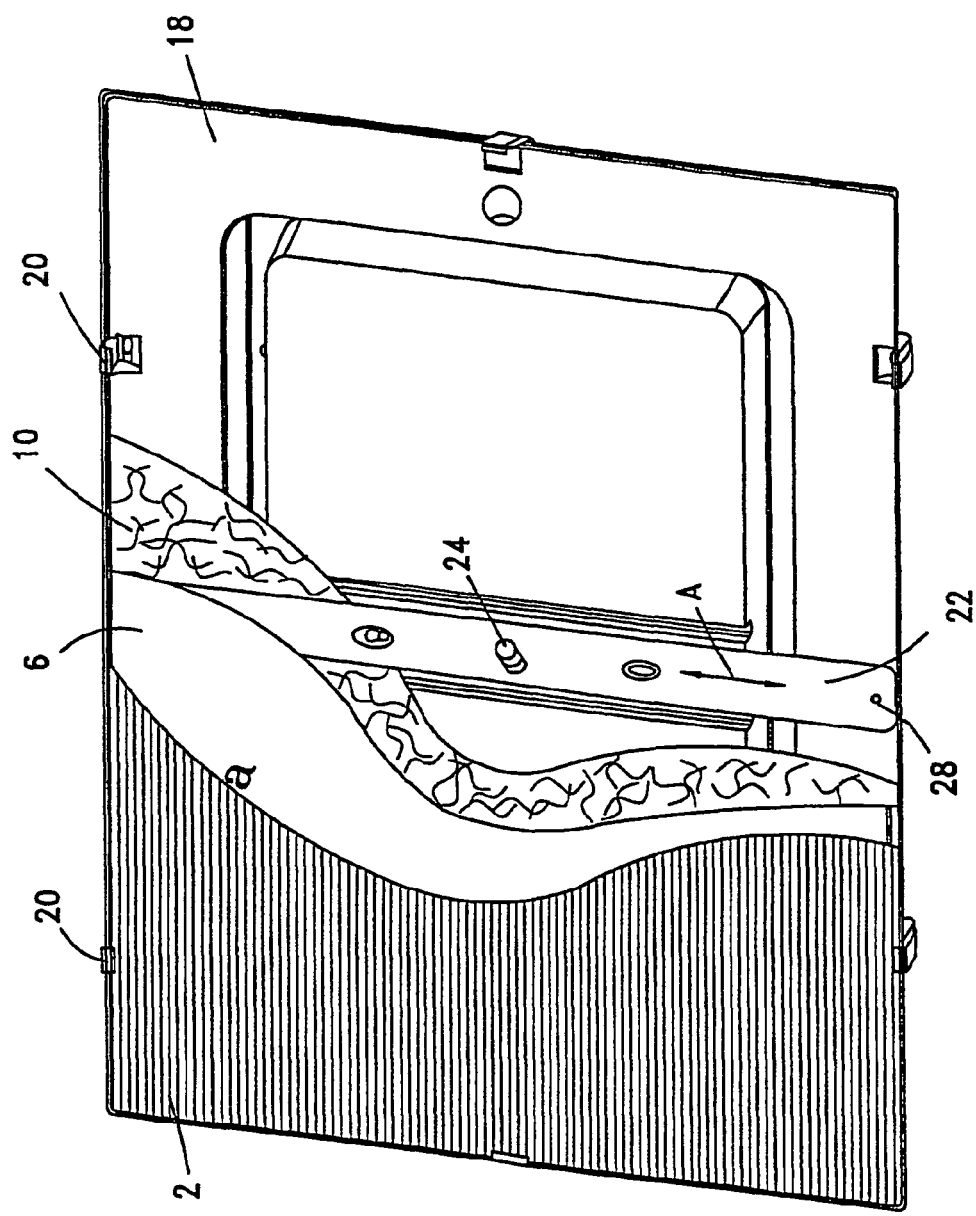
FIG. 4 is a perspective view of a dynamic display containing an elastically resilient support means of the present invention.

FIG. 4 shows a front view of a dynamic display unit according to the invention, i.e. a display unit in which the image-carrying sheet and the lenticular lenses are in constant movement relative to each other. The display unit is single-faced, i.e. three layers are inserted into a plastic housing 18: a lenticular panel 2, an image-carrying film 6 and an elastically resilient mat-like element 10. The layers are shown in partially removed view in the Figure, so that they are all exposed. Lenticular panel 2 is attached to housing 18 by spring clasps 20 Which press panel 2 against the image-carrying film 6 and toward mat-like element 10. A cross member 22 extends across the unit and is coupled to an eccentric cam 24, which, when rotated by a geared motor 27 (not shown), displaces cross member 22 in the direction of double arrow A.

The display unit may be either battery-operated or connected to the power main. It provides a changing image presentation at very low cost. The print is disposable and is easy to replace.

Figure 5:
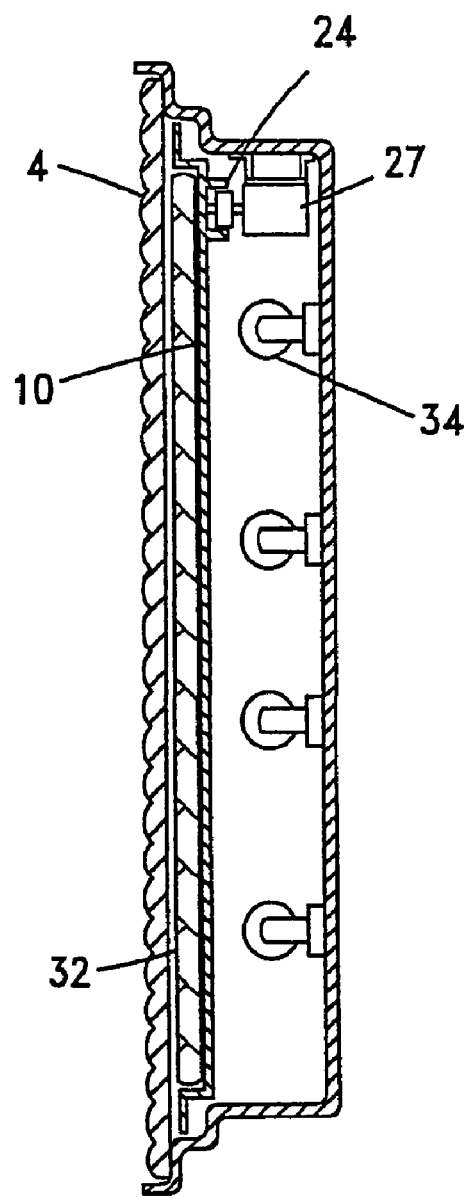
FIG. 5 is a vertical cross-sectional view of another embodiment of a display unit, which includes back-lighting.

FIG. 5 is a cross-sectional view of another preferred embodiment of a display unit, which is provided with a back-lighting arrangement for illuminating the graphic presentation. In this unit, mat-like element 10 is transparent, acts to diffuse the light coming from neon tubes 34, positioned at the back of the unit and is designed to allow passage of enough light to provide adequate illumination of the transparent indicia-carrying sheet 32. A geared motor 27, coupled to an eccentric cam 24, displaces the indicia carrier 32 perpendicular to the axes of lenses 4.

Figure 6:
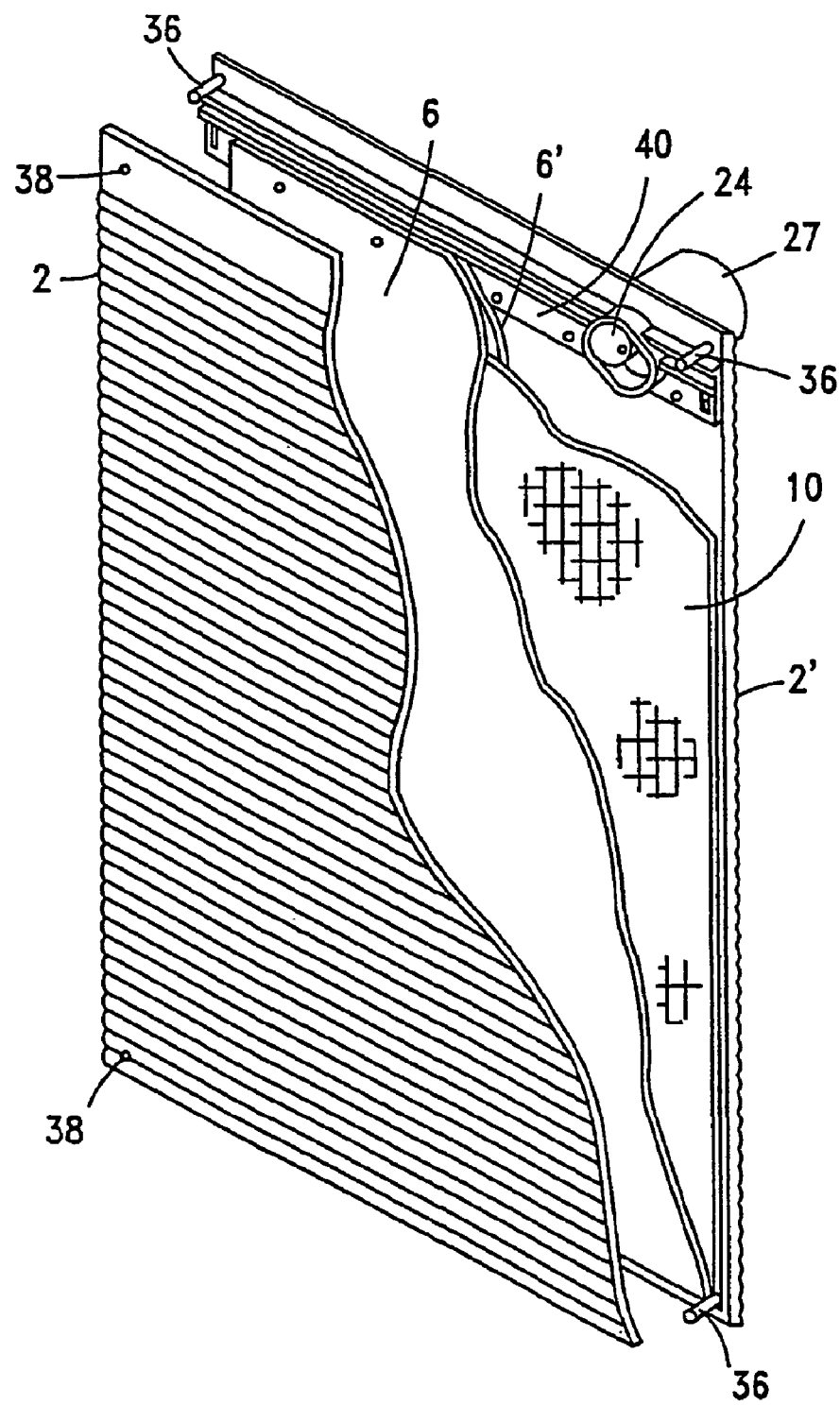
FIG. 6 is a perspective view of a double-faced display unit containing an elastically resilient support means of the invention.
Figure 7:
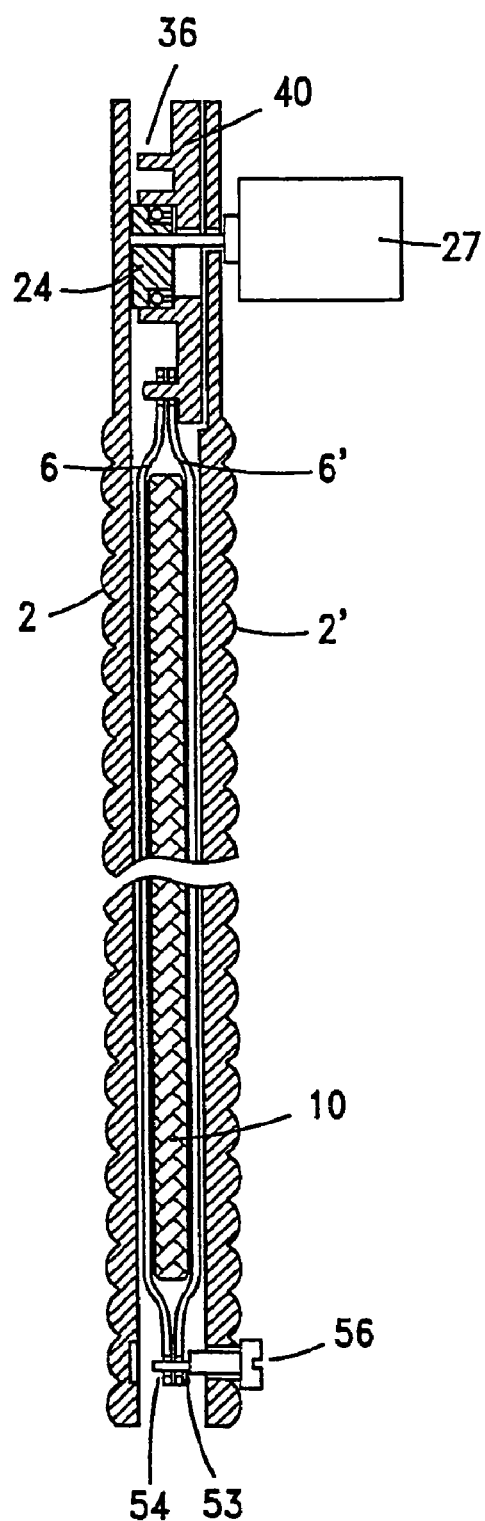
FIG. 7 is a cross-sectional view of the display unit of FIG. 6.

FIG. 6 and FIG. 7 show, in perspective and cross-sectional views respectively, a double-faced, dynamic display unit according to a preferred embodiment of the invention. The unit comprises a front lenticular panel 2 and a rear lenticular panel 2'. Rear panel 2' serves as the principal means of support and carries four pins 36 to be inserted into corresponding holes 38 of front panel 2. The indicia carrier comprises sheets 6 and 6', spaced apart by mat-like element 10. While moving relative to the front panel 2 and rear panel 2', sheets 6 and 6' are constantly pressed against the respective rear faces of panels 2 and 2' by mat-like element 10. A geared motor 27, coupled to an eccentric cam 24, vertically displaces cross member 40, which provides the relative motion between the lenses and the image-carrying sheets.

In FIG. 7, there is also shown a means of adjusting the angular alignment between indicia carrier 6 and 6' and the lenticular panels 2 and 2'. At the lower edge of each film 6 and 6' is located an elongated slot 53. Slot 53 fits over pin 54, which is eccentrically mounted on the end of non-advancing screw 56. Turning screw 56 causes eccentric pin 54 to tilt the indicia-carrier 6 and 6' until a perfect alignment with the lenses is achieved.

Figure 8:
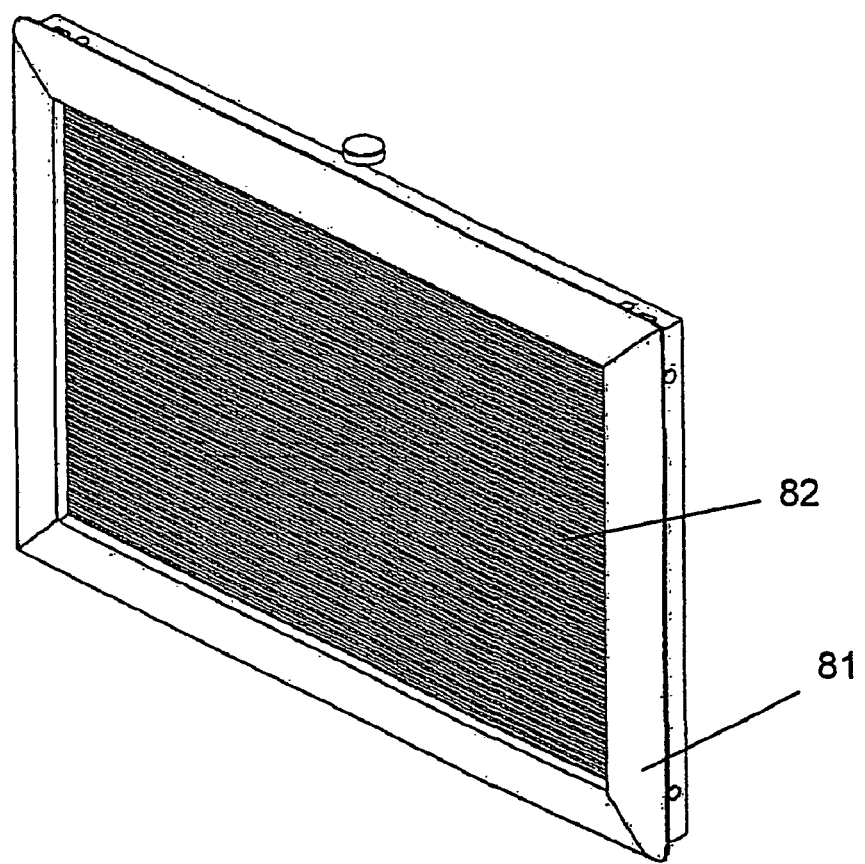
FIG. 8 is a frontal perspective view of a display unit according to another preferred embodiment of the invention.

FIGS. 8 to 11 show a preferred embodiment of the invention that provides a "cut to measure" display system. FIG. 8 shows a frontal perspective view of the unit. The framing of the unit is created by extruded aluminum profiles 81. The lenticular panel at the front of the unit is designated by numeral 82.

Figure 9A:
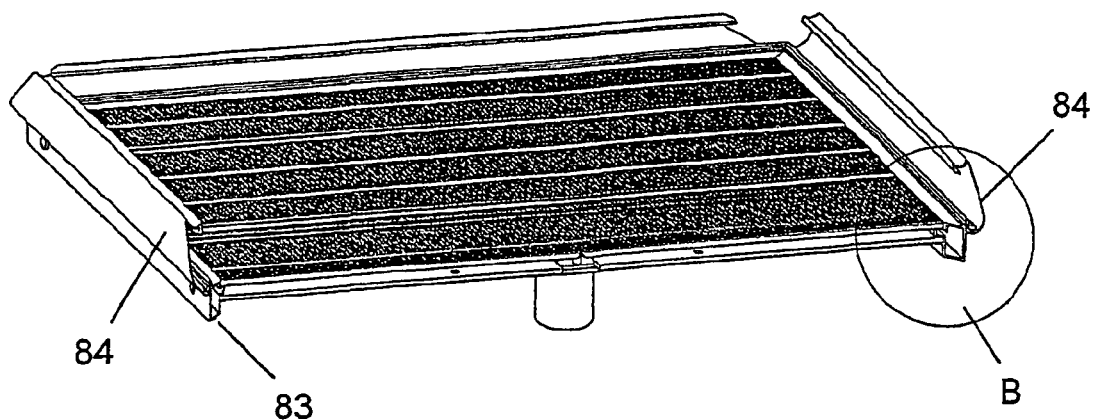
FIG. 9A is a cutoff perspective view of the unit of FIG. 8.

FIG. 9A is a cutoff perspective view, showing the framing profiles (81 in FIG. 8) in a semi-open position. The profiles consist of a "flip" part 84 pivotally connected to a main, basic part 83.

Figure 9B:
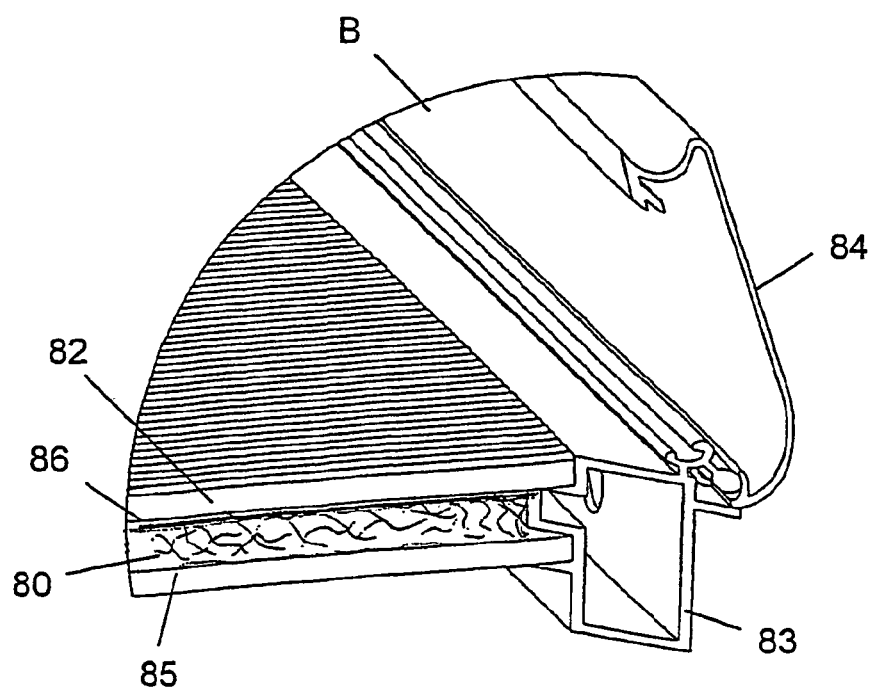
FIG. 9B is a magnified detail of section B of FIG. 9A.

FIG. 9B is a magnified detail of section B of FIG. 9A. In the figure, the lenticular panel 82, sheet of print 86, resilient mat-like element 80, and a rear supporting wall, 85 which is integrated into the basic part of the profile 83 are shown. A leaf spring (not shown) secures the flip part 84 of the profile in one of its two positions. When open, as shown in FIG. 9A, the internal parts of the unit can be cleaned or serviced and the sheet of print 86 changed. For normal operation of the unit, the profile is flipped shut, as shown in FIG. 8. In the closed position, the lenticular panel 82 and sheet of print 86 are pressed against resilient mat-like element 80 insuring that the sheet 86 is in proper contact with the back of the panel 82 for proper display of the printed information.

Figure 10A:
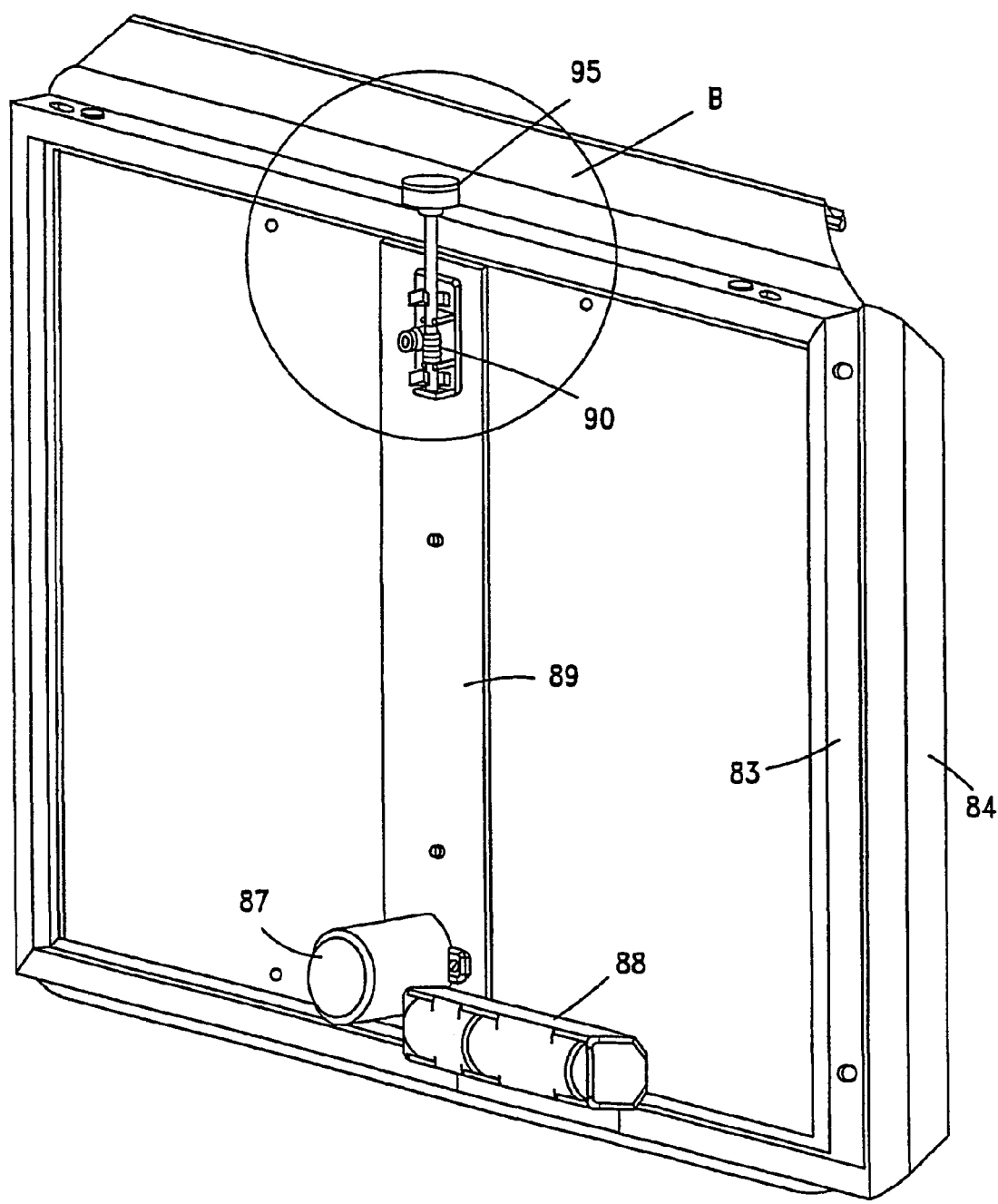
FIG. 10A shows the rear side of the display unit of FIG. 8.
Figure 10B:
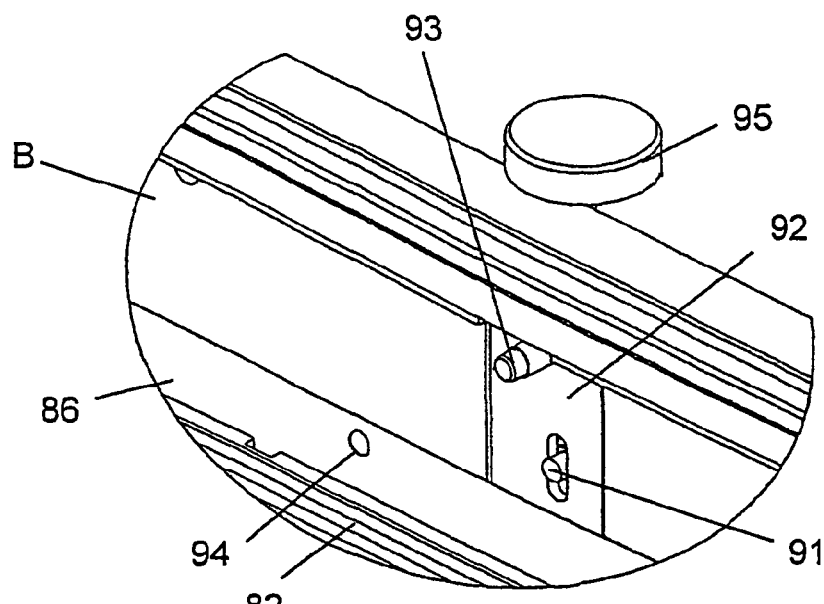
FIG. 10B is a magnified detail of section B of FIG. 10A (looking from the front side of the unit)
Figure 11:
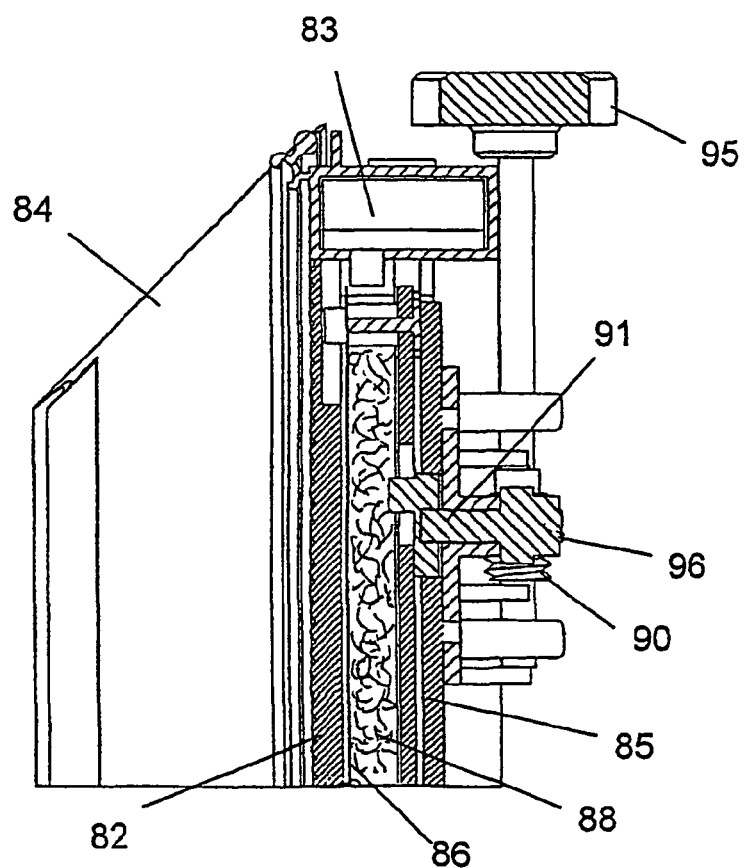
FIG. 11 is a magnified side perspective view of the upper part of the unit of FIG. 10A.

FIG. 10A shows the rear side of the display unit of FIG. 8. Shown in the figure are the framing profiles 83 and 84, a DC motor 87, batteries 88, and a vertical beam 89. On the top of beam 89 are means for adjusting the angular alignment of the print 86, relative to the lenticular panel 82. The parts and operation of these adjustment means can be more clearly seen and understood by referring to FIGS. 10B and 11. FIG. 10B shows section B of FIG. 10A (looking from the front side of the unit). FIG. 11 is a magnified side perspective view of the upper part of the unit of FIG. 10A.

The sheet of print 86 is generally supported by the upper pin 93 of ruler 92, which passes through the upper puncture 94 on sheet 86. A lower pin (not shown), located near the bottom of ruler 92, passes through the lower part of sheet 86. The ruler 92 is moved up and down by the geared motor, as explained hereinabove with reference to FIGS. 4 through 6. The periodic motion of the print 86 (attached to the ruler) projects the images through the lenticular panel 82.

The alignment of the print on sheet 86 with the axis of the lenses on sheet 82 is accomplished in the following manner. Turning knob 95, causes gear 90 to rotate, which in turn rotates screw 96. Attached to screw 96 is an eccentric pin 91 which projects through ruler 92 that supports the printed sheet 86. Thus slightly turning knob 95 will cause a shift in the angle of the print relative to the lenses whose position is fixed in the display unit.

The size of the display unit of the embodiment of the invention shown in FIGS. 8 through 11 is easily determined by cutting the profiles to the desired length. Then standard parts such as the motor, batteries, adjustment means, etc. are added to "custom make" the unit for any use.

As can be understood by the man of the art from the above representative but not limitative examples, display units, using the support and adjustment means of the invention, may be designed to be hung at a point of sale, or over a window, or to stand independently, for example on street corners. The units may present images in one or both faces. They may have either a static or dynamic relationship between the image-carrying film(s) and lenticular panel(s). While in the passive versions the observer needs to move, the dynamic versions are capable of displaying changing images to a stationary observer.

Although embodiments of the invention have been described by way of illustration, it will be understood that the invention may be carried out with many variations, modifications, and adaptations, without departing from its spirit or exceeding the scope of the claims.

The invention claimed is:
1. A lenticular display unit comprising:
    an indicia carrier;
    a lenticular panel including lenses;
    a motor adapted to achieve relative movement between the indicia carrier and the lenticular panel; and
        a pressure applicator adapted to maintain a required spatial relationship between the indicia carrier and the lenticular panel, said indicia carrier placed between the lenticular panel and the pressure appli- cator, said pressure applicator adapted to apply pressure on said indicia carrier wherein said pressure applicator is positioned behind a rear face of the indicia carrier and applies a pressure thereon, wherein the pressure applicator comprises an elastically resilient mat-like element, wherein the elastically resilient mat-like element is composed of a material chosen from the following group:

flexible fibers,
cloth,
felt,
fleece,
corrugated flexible film, and
bubble plastic.

2. A unit according to claim 1, wherein the pressure applicator comprises springs.

3. A unit according to claim 1, which is single-faced and contains:

one lenticular panel;
one indicia carrier; and
one elastically resilient mat-like element for maintaining a required distance between said indicia carrier and said lenticular panel.

4. A unit according to claim 3, further comprising an angular aligner adapted to acquire and maintain a required angular alignment between the indicia carrier and the lenticular panel.

5. A unit according to claim 1, which contains a backlighting arrangement for illuminating a graphic presentation provided on the indicia carrier.

6. A unit according to claim 1, wherein the elastically resilient mat-like element comprises an array of leaf springs.

7. A lenticular display unit comprising:

an indicia carrier;
a lenticular panel including lenses;
a motor adapted to achieve relative movement between the indicia carrier and the lenticular panel; and
a pressure applicator adapted to maintain a required spatial relationship between the indicia carrier and the lenticular panel, said indicia carrier placed between the lenticular panel and the pressure applicator, said pressure applicator adapted to apply pressure on said indicia carrier wherein the pressure a applicator is adapted to maintain a required distance between the indicia carrier and the lenticular panel, said pressure applicator comprising an elastically resilient mat-like element that is substantially transparent.

8. A lenticular display unit comprising:

an indicia carrier;
a lenticular panel including lenses;
a pressure applicator adapted to maintain a required spatial relationship between the indicia carrier and the lenticular panel, said indicia carrier placed between the lenticular panel and the pressure applicator, said pressure applicator adapted to apply pressure on said indicia carrier; and
an angular aligner including a screw and an eccentrically mounted pin adapted to acquire and maintain a required angular alignment between the indicia carrier and the lenticular panel.

9. A unit according to claim 8, said screw contains said eccentrically mounted pin penetrates said indicia carrier and, when said screw is turned, causes said indicia carrier to tilt.

10. A unit according to claim 8, wherein said screw is connected to said eccentrically mounted pin, and said eccentrically mounted pin penetrates an element of said display system to which said indicia carrier is attached and, when said screw is turned, causes said indicia carrier to tilt.

11. A unit according to claim 8, wherein said lenticular display system is static.

12. A unit according to claim 8, wherein said lenticular display system is dynamic.

13. A lenticular display system comprising:

an indicia carrier;
a lenticular and panel including lenses;
a motor adapted to achieve relative movement between the indicia carrier and the lenticular panel; and
a pressure applicator adapted to maintain a required spatial relationship between the indicia carrier and the lenticular panel, said indicia carrier placed between the lenticular panel and the pressure applicator, said pressure applicator adapted to apply pressure on said indicia carrier, wherein said lenticular display system is double-faced and contains:
a second lenticular panel;
a second indicia carrier; and
one elastically resilient mat-like element for maintaining a required distance between each said indicia carrier and each said lenticular panel.

14. A unit according to claim 13, further comprising an angular aligner adapted to acquire and maintain a required angular alignment between the indicia carrier and the lenticular panel.

15. A display device, comprising:

an indicia carrier;
a lenticular and including lenses adapted to display information from the indicia carrier; and
an elastically resilient mat-like element adapted to maintain a required distance between the indicia carrier and the lenticular panel,
wherein the mat-like element has a contiguous area which covers most of the area of the indicia carrier and is composed of a material chosen from the following group:
flexible fibers,
cloth,
felt,
fleece,
corrugated flexible film, and
bubble plastic.

16. A device according to claim 15, wherein said mat-like element is substantially transparent.

17. A display device according to claim 15, wherein the elastically resilient mat-like-element comprises an array of leaf springs.

* * * * *